US012705160B2

(12) United States Patent
Griffin et al.

(10) Patent No.: US 12,705,160 B2
(45) Date of Patent: Aug. 11, 2026

(54) MANAGING COMPUTING RESOURCE CONSUMPTION OF SOFTWARE APPLICATIONS USING CONTROL GROUPS TO FACILITATE SAFETY COMPLIANCE

(71) Applicant: RED HAT, INC., Raleigh, NC (US)

(72) Inventors: Leigh Griffin, Waterford (IE); Pierre-Yves Chibon, Saint-Pol-de-Leon (FR); Priyanka Verma, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 264 days.

(21) Appl. No.: 18/536,434

(22) Filed: Dec. 12, 2023

(65) Prior Publication Data

US 2025/0190326 A1 Jun. 12, 2025

(51) Int. Cl.
*G06F 11/34* (2006.01)
*G06F 9/50* (2006.01)

(52) U.S. Cl.
CPC ........ *G06F 11/3476* (2013.01); *G06F 9/5027* (2013.01)

(58) Field of Classification Search
CPC .......................... G06F 9/5027; G06F 11/3476
USPC .......................................................... 717/127
See application file for complete search history.

(56) References Cited

U.S. PATENT DOCUMENTS 8,656,367 B1 * 2/2014 Sharma ............... G06F 11/3466 717/124
2013/0110992 A1 * 5/2013 Ravindra .............. H04W 4/185 709/220
2016/0062810 A1 * 3/2016 Von Wendorff ...... G06F 11/079 714/38.1
2020/0356397 A1 * 11/2020 Kumatagi ........... G06F 9/45558
2023/0156690 A1 * 5/2023 Hao .................. H04W 72/1263 370/329
2023/0222005 A1 * 7/2023 Mitra .................... G06F 9/5016 718/1
2024/0329964 A1 * 10/2024 Mesde ...................... G06F 8/60

* cited by examiner

*Primary Examiner* — Bradford F Wheaton
(74) *Attorney, Agent, or Firm* — Kilpatrick Townsend & Stockton LLP

(57) ABSTRACT

A system can be provided for managing computing resource consumption of user loaded software applications using control groups to facilitate safety compliance. For example, the system can detect an interference event between a user application executing within safety management system and a functional safety application executing within the safety management system. In response to detecting the interference event, the system can generate a control group for the user application. The control group can specify a portion of system resources of the safety management system to allocate to the user application. The system can then migrate the user application to the control group to allocate the portion of the system resources to the user application. In doing so, reoccurrence of the interference event can be prevented.

17 Claims, 3 Drawing Sheets

300

MANAGING COMPUTING RESOURCE CONSUMPTION OF SOFTWARE APPLICATIONS USING CONTROL GROUPS TO FACILITATE SAFETY COMPLIANCE

TECHNICAL FIELD

The present disclosure relates generally to software deployment and evaluation and, more particularly (although not necessarily exclusively), to managing computing resource consumption of software applications using control groups to facilitate safety compliance.

BACKGROUND

Many organizations around the globe have developed functional safety standards for software and electronics. Functional safety relates to reducing risks so that computing systems function safely in the event that there is a malfunction. One example of a functional safety standard is ISO 26262 for automotive electronics. Functional safety standards can be used to avoid or mitigate systematic failures and hardware failures to prevent hazardous operational situations. A software package can be certified to a functional safety standard based on a target level of risk reduction. For example, an Automotive Safety Integrity Level (ASIL) assignment with respect to ISO 26262 has four possible levels of safety requirements: ASIL A, ASIL B, ASIL C, and ASIL D. ASIL D has the highest safety requirements of the four possible levels and includes the safety requirements of the three preceding levels.

Execution of such software packages can be controlled using Control Groups (cgroups). Cgroups are a resource management and control feature within the Linux kernel. Cgroups can be used to allocate system resources among processes in a multi-process environment. For example, cgroups can allow administrators to set resource limits, priorities, and isolation policies. Thus, using Cgroups can ensure that system resources like CPU, memory, and I/O are allocated efficiently, which can prevent resource contention issues and enable effective management of workloads.

DETAILED DESCRIPTION

Figure 1:
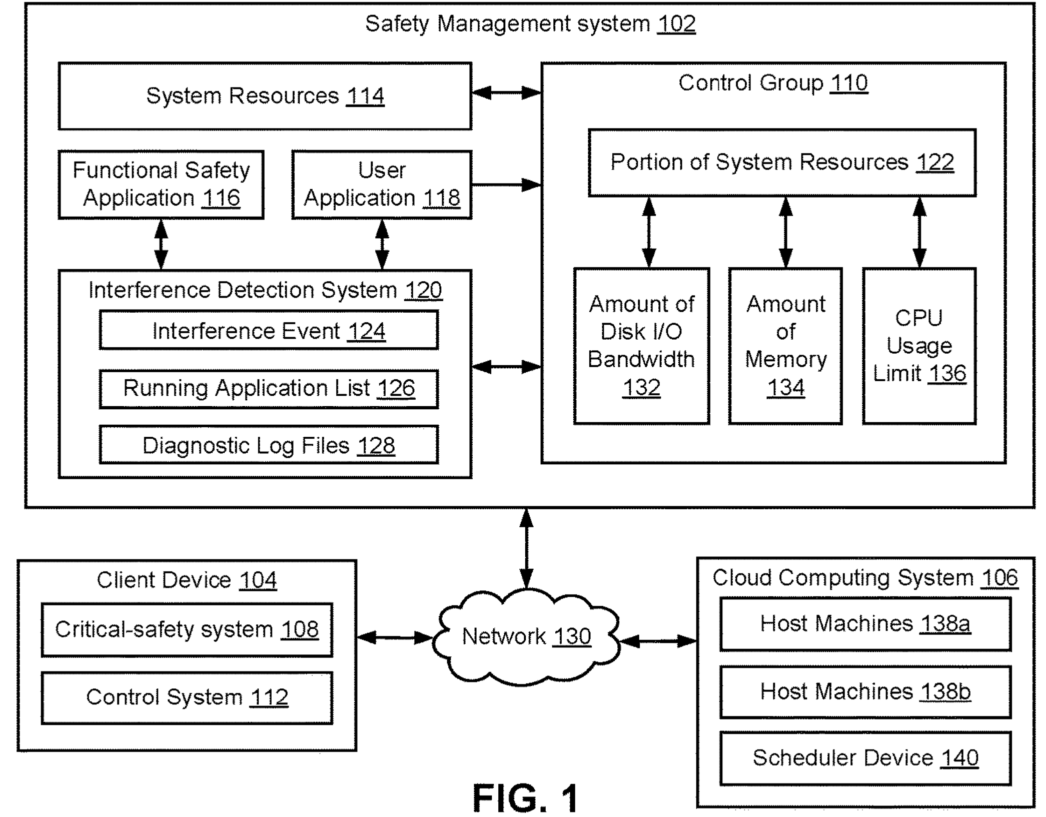
FIG. 1 is a block diagram of an example of a computing environment for managing computing resource consumption of software applications using control groups to facilitate safety compliance according to some embodiments of the present disclosure.

A software developer or software development organization may want or need to comply with a functional safety standard issued by a standard-setting organization when deploying a software application at a device with one or more critical-safety systems. Additionally, users of the device may load software applications to the device. In some cases, a process (e.g., an API call or a resource call) of the software developer deployed or user loaded software application may interfere with a functional safety software application of the critical-safety system. For example, there may be conflicts associated with resource consumption, task scheduling or execution, communication, or any combination of these between the process and the functional safety application. When such interference occurs, it can cause unpredictable behavior (e.g., failures, malfunctions, etc.) for the critical-safety system, which can cause hazardous operational situations.

Some examples of the present disclosure can overcome one or more of the issues mentioned above via a system that uses a kernel-level mechanism (e.g., control groups (cgroups)) to govern resource consumption of software applications. In this way, the system can prevent interference between software applications to facilitate safety compliance. For example, the system can detect an interference event between a user loaded software application and a functional safety software application. The interference event can degrade performance of the functional safety application, which can lead to unpredictable behavior of an associated critical-safety system. To terminate and prevent re-occurrence of the interference event, the system can generate a control group (cgroup) for the user application. The cgroup can specify a portion of computing resources (e.g., CPU, memory, and disk I/O bandwidth) that the user application can use. When the user application is executed with the control group, the user application can be limited to the portion of system resources defined by the control group while the functional safety application may use any remaining available resources. Thus, the user application can be executed in an isolated manner in which it cannot interfere with and negatively impact performance of the functional safety application. Accordingly, the system can facilitate safety compliance without implementing alternative approaches such as rejecting execution of the user application. This can enable various software applications to be deployed at devices with critical-safety systems, without risking non-compliance of functional safety standards for the critical-safety systems.

In one particular example, a computing system with a critical-safety system can execute a safety management system. The computing system can be an automotive system and the critical-safety system can be a break subsystem of the automotive system. The safety management system can execute a functional safety application for detecting emergency breaking situations. For example, the functional safety application may determine whether breaking assist is required based on data indicating a speed and force at which a driver applies breaking power. If the functional safety application determines that break assist is required, the functional safety application can transmit instructions to a controller to cause the break subsystem to initiate break assist. The safety management system can also execute a user application loaded to the automotive system by a user. The user application can be, for example, a navigational software application.

While executing the user application and the functional safety application, the safety management system can monitor diagnostic log files produced by the functional safety application. In doing so, the safety management system may detect a memory allocation collision between the applications, which can degrade performance of one or both of the applications. In the case of the functional safety application, the performance degradation can be hazardous to the driver. Therefore, in response to detecting the memory allocation collision, the system can generate a cgroup for the user application that specifies an amount of memory the user application can access. The safety management system can then migrate the user application to the cgroup to allocate the amount of memory to the user application. The user application can then execute in an isolated manner using the allocated memory space while the functional safety application can use remaining available memory resources. As a result, the memory allocation collision between the user application and the functional safety application cannot reoccur.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for managing computing resource consumption of software applications using control groups (cgroups) to facilitate safety compliance according to some embodiments of the present disclosure. The computing environment 100 can include a cloud computing system 106, client device 104, and a safety management system 102 (e.g., a vehicle safety management system). The cloud computing system 106, client device 104, and safety management system 102 can be communicatively coupled via a network 130. The network 130 may be a public network (e.g., the internet), a private network (e.g., a local area network (LAN) or wide area network (WAN)), or a combination thereof. The network 130 may carry communications (e.g., data, message, packets, frames, etc.) between components of the computing environment 100.

Examples of the client device 104 can include an automotive system, medical device system, desktop computer, laptop computer, server, mobile phone, or tablet. In some examples, one or more functional safety standards can be associated with the client device 104 to avoid or mitigate systematic failures and hardware failures. For example, the client device 104 can include a critical-safety system 108. The critical-safety system 108 can be a system that may cause hazardous operational situations (e.g., harm to a user of the client device 104 or to an environment associated with the client device 104) if the system fails or malfunctions. Thus, software applications or other suitable components interacting with the critical-safety system 108 can be required comply with a functional safety standard for the critical-safety system 108.

To facilitate safety compliance, the computing environment 100 can include the safety management system 102. The safety management system 102 can execute an interference detection system 120, a functional safety application 116, and one or more user applications. The user applications may be any application that is not safety-related, such that it does not take part in controlling or operating the critical-safety system 108. For example, user application 118 may be a music application, a movie application, a video game application, an internet application (e.g., a web browser), a navigational application (e.g., GPS maps), a telephone application, a heating/ventilation/air conditioning (HV AC) application for the cabin, etc. In contrast, the functional safety application 116 may interact with (e.g., control) the critical-safety system 108. For example, the functional safety application 116 may control movement (e.g., acceleration, velocity, breaking, and/or steering) of a vehicle.

The control system 112, can be communicatively coupled to the safety management system 102 via the network 130 or a communication bus to facilitate wired or wireless communication. In some examples, the safety management system 102 and the control system 112 can each be part of (e.g., mounted (e.g., attached) on or inside) the client device 104. The control system 112 can control the critical-safety system 108 or other suitable aspects of the client device 104. For example, the client device 104 can be a vehicle and the control system 112 can be a vehicle control system. The vehicle control system can be communicatively coupled to the machinery/components (e.g., accelerator, engine, transmission, brakes, etc.) of the vehicle. The vehicle control system may continuously interrogate or poll these systems for data associated with position or movement (e.g., current direction, current acceleration, current velocity, current breaking state, current steering, and/or Global Positioning System (GPS) state) of the vehicle. The control system 112 can send the information to the safety management system 102 automatically or upon receiving a request from the safety management system 102. The control system 112 can further to receive instructions from the safety management system 102 and forward the instructions to corresponding machinery/components of the client device (e.g., the vehicle) to control an aspect of the client device (e.g., the movement of the vehicle).

The cloud computing system 106 can include host machines 138*a-b* and a scheduler device 140, which can be communicatively coupled to one another via the network 130 to provide services and/or computing resources to the safety management system 102. The scheduler device 140 may receive requests from one or more software applications (e.g., the functional safety application 116 or the user application 118). In response, the scheduler device 140 may identify which of the host machines 138*a-b* within the cloud computing system 106 is currently capable (e.g., by having the appropriate hardware and/or software) of processing the request. The scheduler device 140 may then forward the request to the identified host machine 138*a*, receive the result of the processed request from the host machine 138*a*, and transmit the result to the application. The safety management system 102 may generate the instructions transmitted to the control system 112 based on information received from the cloud computing system 106.

Additionally, in an example, the safety management system 102 can allocate a first portion of the system resources 114 to the functional safety application 116. The system resources 114 can include processing resources (e.g., central processing unit (CPU) cores and threads), memory resources, networking resources (e.g., network bandwidth, network ports), and data storage resources. Thus, the safety management system 102 might allocate, for example, 1 CPU core with 2 threads, 100 megabytes of memory space, and a network port with 5 megabits per second (Mbps) of network bandwidth to the functional safety application 116. Similarly, the safety management system 102 can allocate a second portion of the system resources 114 to the user application 118.

However, when the safety management system 102 simultaneously executes the functional safety application 116 and the user application 118, the user application's use of its respective allocated system resources can create an interference event 124 with the allocated system resources of the functional safety application 116. The interference event 124 can degrade a performance of the functional safety application 116. For example, the interference event 124 can affect a capability of the functional safety application 116 to efficiently and effectively acquire data from the control system 112, generate instructions based on the feedback data, transmit the instructions to the control system 112, or a combination thereof. The interference event 124 can be or involve a memory out-of-bounds access error, an execution timing error, a memory allocation collision error, a memory corruption error, or a network bottleneck (e.g., congestion).

To minimize the negative impact of interference events, the safety management system 102 can detect which user applications are causing interference and isolate the user applications using control groups. For example, the safety management system 102 can be executing the interference detection system 120 to detect that the interference event 124 has occurred. In the example, the safety management system 102 or the interference detection system 120 can access and analyze diagnostic log files 128 of the functional safety application 116, the user application 118, or a combination thereof to detect the interference event 124. The safety management system 102 may further determine when the interference event 124 occurred based on the diagnostic log files 128. In some examples, after detecting the interference event 124, the safety management system 102 can identify which user application caused the interference event 124 by accessing a running application list 126. In particular, the safety management system 102 can analyze the running application list 126 to determine which user application was executing at a time corresponding to the interference event 124.

After identifying the user application 118, the safety management system 102 can generate a control group (cgroup) 110. The cgroup 110 can be a kernel-level mechanism (e.g., a feature within the Linux kernel) related to resource management and control. The cgroup 110 can be used to allocate a portion of system resources 122 among processes of software applications. For example, the cgroup 110 can include system resource limits to control how much of a system resource (e.g., memory, CPU, etc.) can be used by a software application or process. The cgroup 110 can also have a hierarchical structure to prioritize access to system resources 114 for particular software applications or processes. Thus, using the cgroup 110 can ensure that system resources 114 like CPU, memory, and disk I/O are allocated efficiently to prevent interference events. In some examples, other kernel-level mechanisms (e.g., traffic control, CPU sets, etc.) by which an operating system can control and manage computing resource allocation to software application processes may be used. After the cgroup 110 or other suitable kernel-level mechanism is generated, the safety management system 102 can migrate the user application 118 to the cgroup 110. In doing so, the safety management system 102 can control access to the system resources 114 for the user application 118 to terminate and prevent reoccurrence of the interference event 124.

In some examples, the cgroup 110 can be predefined. For example, the functional safety application 116 can require a first portion of system resources (e.g., a first portion of memory, a first portion of CPU, and a first portion of disk I/O bandwidth) to execute efficiently. The safety management system 102 may detect the first portion of system resources and may further detect a second portion of resources (e.g., a second portion of memory, a second portion of CPU, and a second portion of dis I/O bandwidth). The second portion of system resources can be separate from the first portion of system resources. The safety management system 102 can then configure the predefined cgroup to specify the second portion of system resources. When the interference event 124 is detected, the safety management system 102 can automatically migrate the user application 118 to the predefined cgroup. As a result, the user application 118 can be limited to using the second portion of system resources to prevent further occurrence of the interference event 124.

In other examples, the safety management system 102 can generate the cgroup 110 or adjust the parameters of the predefined cgroup based on the interference event 124. For example, the interference event 124 can involve a memory allocation collision event or other suitable error with respect to memory consumption. The memory allocation collision event can involve the user application 118 and the functional safety application 116 attempting to use the same portion of memory, which can degrade performance of one or both of the applications. To terminate and prevent reoccurrence of a memory related inference event, the cgroup 110 can be configured with a memory limit. The memory limit can be an amount of memory 134 (e.g., measured in bytes) that is allocated to the cgroup 110. After migration to the cgroup 110, the user application 118 can use the amount of memory 134 allocated to the cgroup 110, while the functional safety application 116 may access any remaining, available memory resources. As a result, the user application 118 can be isolated with respect to memory consumption and cannot interfere with memory resources required for effectively executing (e.g., without errors) the functional safety application 116.

In another example, the interference event 124 can be associated with CPU usage of the user application 118. For example, the user application 118 can be consuming a significant portion of CPU power. As a result, the functional safety application 116 may not have sufficient CPU power, which may lead to slower runtimes for the functional safety application 116. To terminate and prevent reoccurrence of a CPU usage related inference event, the cgroup 110 can be configured with a CPU usage limit 136. For example, the cgroup 110 can be allocated a percentage (e.g., 30%, 50%, etc.) of a CPU core, a certain number of CPU cores, or a percentage of CPU time. Therefore, after migration to the cgroup 110, the user application 118 can be limited to the CPU resources allocated to the cgroup 110 to ensure that a sufficient portion CPU resources are available to the functional safety application 116. Similarly, the user application 118 can be consuming a significant portion of disk I/O, which can also negatively impact performance of the functional safety application 116. To terminate and prevent reoccurrence of a disk I/O related inference event, the cgroup 110 can be configured with a disk I/O bandwidth limit. The user application 118 can then be migrated to the cgroup 110 at which point the user application 118 can access an amount of disk I/O bandwidth 132 corresponding to the disk I/O bandwidth limit.

Additionally or alternatively, in some examples, the safety management system 102 may generate a cgroup for the functional safety application 116 and can migrate the functional safety application 116 to the cgroup. The cgroup for the functional safety application 116 can be allocated a sufficient portion of the system resources 114 (e.g., the first portion of system resources) for executing the functional safety application 116 without errors. The user applications loaded and executed at the safety management system 102 cannot use system resources allocated to the cgroup for the functional safety application 116, thereby preventing inference for the functional safety application 116. For example, the cgroup for the functional safety application 116 can be assigned a particular amount of computing resources, such as CPU, memory, and disk I/O bandwidth, or can be assigned higher priority to computing resources than the cgroup 110.

Although FIG. 1 shows only a select number of cloud computing systems (e.g., cloud computing system 106) and computing devices (e.g., scheduler device 140 and safety management system 102), the computing environment 100 may include any number of cloud computing systems and computing devices that are interconnected in any arrangement to facilitate the exchange of data between the cloud service systems and computing devices. Additionally, the cloud computing system 106, including host machines 138*a-b* and scheduler device 140, as well as the safety management system 102, and control system 112 may each be any suitable type of computing device or machine that has a processing device, for example, a server computer, a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

Figure 2:
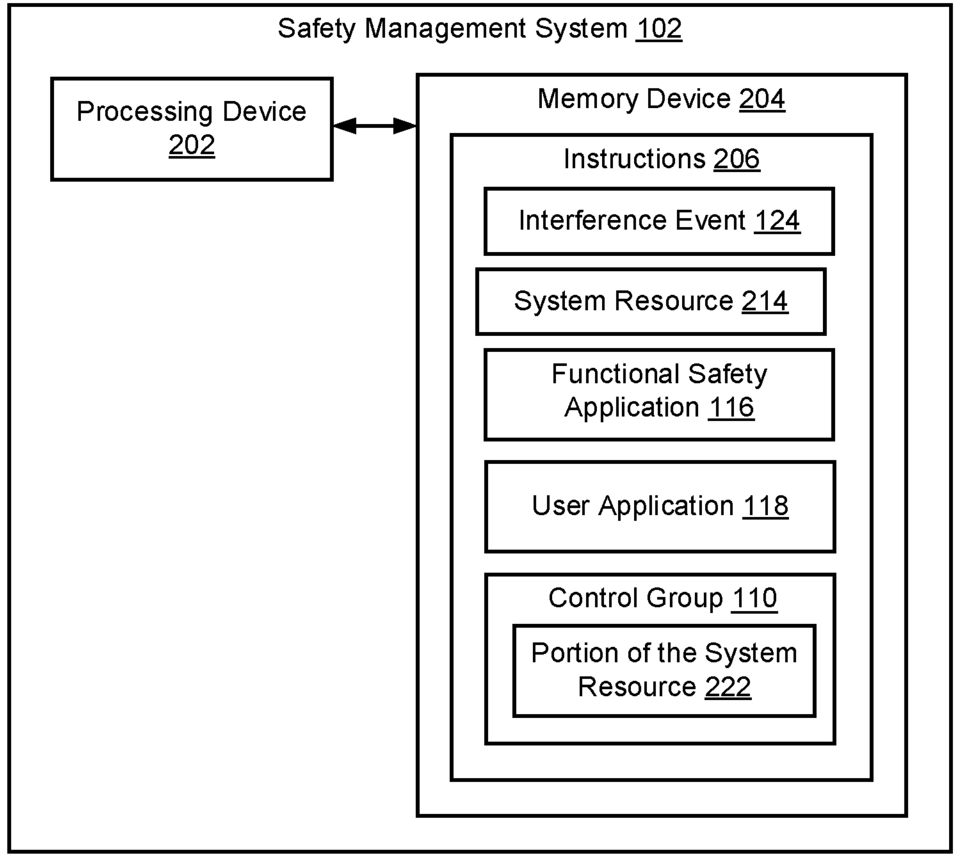
FIG. 2 is a block diagram of an example of a safety management system according to some embodiments of the present disclosure.

FIG. 2 is a block diagram of an example of the safety management system 102 according to some embodiments of the present disclosure. The safety management system 102 can include a processing device 202 communicatively coupled to a memory device 204.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code executable to perform operations. Non-limiting examples of a computer-readable medium include magnetic disk(s), memory chip(s), ROM, random-access memory (RAM), an ASIC, a configured processor, and optical storage.

The processing device 202 can execute instructions 206 stored in the memory device 204 to perform operations. Examples of such operations can include any of the operations described above with respect to the safety management system 102. For example, the processing device 202 can detect an interference event 124 between a user application 118 executing within the safety management system 102 and a functional safety application 116 executing within the safety management system 102. The interference event 124 can be associated with a system resource 214 of the safety management system 102 used by the functional safety application 116 and the user application 118. The processing device 202 can further, in response to detecting the interference event 124, generate a control group (cgroup) 110 for the user application 118. The cgroup 110 can be a kernel-level mechanism usable to associate the user application 118 with a portion of the system resource 222. The processing device 202 can then migrate the user application 118 to the cgroup 110. As a result, the portion of the system resource 222 can be allocated to the user application 118 to prevent the interference event 124.

The safety management system 102 can also include other input and output (I/O) components, which are not shown here for simplicity, for receiving user input from and providing information to a user. The input components can include a mouse, a keyboard, a trackball, a touch pad, a touch-screen display, or any combination of these. The output components can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

In some embodiments, some or all of the devices and/or components of safety management system 102 may be implemented with the processing device 202. For example, the safety management system 102 may be implemented as a software application stored within the memory device 204 and executed by the processing device 202. Accordingly, such embodiment can be implemented with minimal or no additional hardware costs. In some embodiments, any of these above-recited devices and/or components rely on dedicated hardware specifically configured for performing operations of the devices and/or components.

Figure 3:
FIG. 3 is a flowchart of an example of a process for managing computing resource consumption of software applications using control groups to facilitate safety compliance according to some embodiments of the present disclosure.
Figure 3:
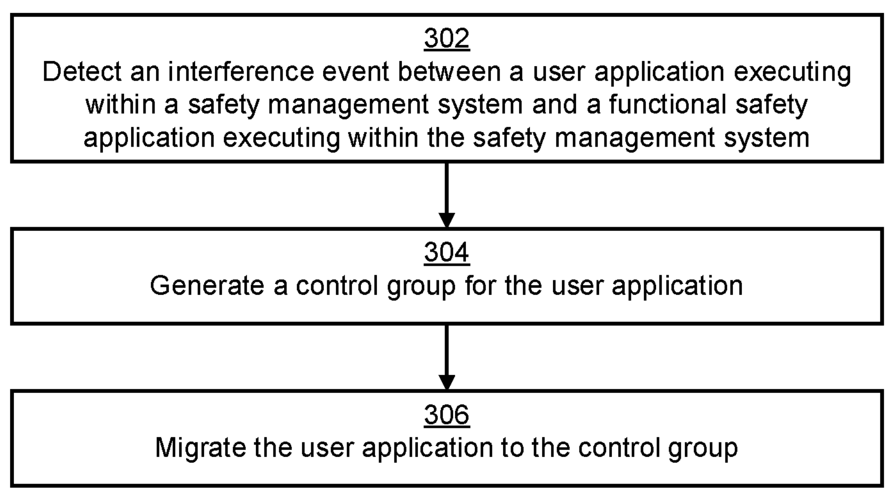

FIG. 3 is a flowchart of an example of a process 300 for managing computing resource consumption of software applications using control groups (cgroups) to facilitate safety compliance according to some embodiments of the present disclosure. In some examples, the processing device 202 can perform one or more of the steps shown in FIG. 3. For example, the processing device 202 can execute the interference detection system 120 or the safety management system 102 of FIG. 1 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

At block 302, the processing device 202 can detect an interference event 124 between a user application 118 executing within a safety management system 102 and a functional safety application 116 executing within the safety management system 102. The interference event 124 can be associated with a system resource 214 of the safety management system 102 that is used by both the functional safety application 116 and the user application 118. For example, the interference event 124 can be an out-of-bounds access error in which both the user application 118 and the functional safety application 116 may write to the same memory space. In particular, the user application 118 may have a bug which causes the user application 118 to overwrite to adjacent memory space used by the functional safety application 116. As a result, data associated with the functional safety application 116 can be altered or corrupted, which can lead to security vulnerabilities, unpredictable behaviors, etc. A diagnostic log file 128 produced by the functional safety application 116 can include an indication of the data corruption. Therefore, the processing device 202 may detect the interference event 124 based on analysis of the diagnostic log file 128.

At block 304, the processing device 202 can generate a cgroup 110 for the user application 118. The cgroup 110 can be a kernel-mechanism that can be used to associate the user application 118 with a portion of a system resource 222. For example, the cgroup 110 can include a parameter that specifies an amount of disk I/O bandwidth 132 of the safety management system 102 to allocate to the user application 118. In the example, the cgroup 110 may further include a second parameter that specifies an amount of memory 134 to provide the user application 118. By setting the amount of disk I/O bandwidth 132 and the amount of memory 134 the user application 118 can access, the cgroup 110 can be used to prevent the out-of-bounds access error.

At block 306, the processing device 202 can migrate the user application 118 to the cgroup 110. In doing so, the portion of the system resource 222 can be allocated to the user application 118 to prevent the interference event 124. In the example, migrating the user application 118 to the cgroup 110 can limit the user application's access to the system resources 114 of the safety management system 102 to the amount of memory 134 and the amount of disk I/O bandwidth 132 defined by the cgroup 110. Due to the user application 118 being unable to use more than the allocated system resources, the out-of-bounds access error or other suitable interference events can be prevented.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

detecting an interference event between a user application executing within a safety management system and a functional safety application executing within the safety management system, the interference event being associated with a system resource of the safety management system used by the functional safety application and the user application, the system resource of the safety management system comprising central processing unit (CPU), memory, and disk input/output (I/O) bandwidth;

in response to detecting the interference event:

determining a first portion of the system resource required for executing the functional safety application, the first portion of the system resource comprising a first portion of the CPU, a first portion of the memory, and a first portion of the disk I/O bandwidth;

determining a second portion of the system resource that is separate from the first portion of the system resource, the second portion of the system resource comprising a second portion of the CPU, a second portion of the memory, and a second portion of the disk I/O bandwidth that are separate from the first portion of the CPU, the first portion of the memory, and the first portion of the disk I/O bandwidth; and generating a control group for the user application, the control group being a kernel-level mechanism usable to associate the user application with the second portion of the system resource; and migrating the user application to the control group, wherein migrating the user application to the control group allocates the second portion of the system resource to the user application and limits access by the user application to the second portion of the system resource to prevent reoccurrence of the interference event.

2. The system of claim 1, wherein the interference event comprises a memory allocation collision event.

3. The system of claim 1, wherein the interference event is related to central processing unit (CPU) usage.

4. The system of claim 1, wherein the interference event is related to disk input/output (I/O) bandwidth usage.

5. The system of claim 1, wherein the operations further comprise, subsequent to detecting the interference event, identifying the user application by accessing a running application list comprising an indication that that user application was executing at a time corresponding to the interference event.

6. The system of claim 1, wherein the interference event is detected based on a diagnostic log file that is generated by the functional safety application.

7. A method comprising:

detecting, by a processing device, an interference event between a user application executing within a safety management system and a functional safety application executing within the safety management system, the interference event being associated with a system resource of the safety management system used by the functional safety application and the user application, the system resource of the safety management system comprising central processing unit (CPU), memory, and disk input/output (I/O) bandwidth;

in response to detecting the interference event:

determining, by the processing device, a first portion of the system resource required for executing the functional safety application, the first portion of the system resource comprising a first portion of the CPU, a first portion of the memory, and a first portion of the disk I/O bandwidth;

determining, by the processing device, a second portion of the system resource that is separate from the first portion of the system resource, the second portion of the system resource comprising a second portion of the CPU, a second portion of the memory, and a second portion of the disk I/O bandwidth that are separate from the first portion of the CPU, the first portion of the memory, and the first portion of the disk I/O bandwidth; and generating, by the processing device, a control group for the user application, the control group being a kernel-level mechanism usable to associate the user application with the second portion of the system resource; and migrating, by the processing device, the user application to the control group, wherein migrating the user application to the control group allocates the second portion of the system resource to the user application and limits access by the user application to second portion of the system resource to prevent reoccurrence of the interference event.

8. The method of claim 7, wherein the interference event comprises a memory allocation collision event.

9. The method of claim 7, wherein the interference event is related to central processing unit (CPU) usage.

10. The method of claim 7, wherein the interference event is related to disk input/output (I/O) bandwidth usage.

11. The method of claim 7, further comprising, subsequent to detecting the interference event, identifying the user application by accessing a running application list comprising an indication that that user application was executing at a time corresponding to the interference event.

12. The method of claim 7, wherein the interference event is detected based on a diagnostic log file that is generated by the functional safety application.

13. A non-transitory computer-readable medium comprising instructions that are executable by a processing device for causing the processing device to perform operations comprising:

detecting an interference event between a user application executing within a safety management system and a functional safety application executing within the safety management system, the interference event being associated with a system resource of the safety management system used by the functional safety application and the user application, the system resource of the safety management system comprising central processing unit (CPU), memory, and disk input/output (I/O) bandwidth;

in response to detecting the interference event:

determining a first portion of the system resource required for executing the functional safety application, the first portion of the system resource comprising a first portion of the CPU, a first portion of the memory, and a first portion of the disk I/O bandwidth;

determining a second portion of the system resource that is separate from the first portion of the system resource, the second portion of the system resource comprising a second portion of the CPU, a second portion of the memory, and a second portion of the disk I/O bandwidth that are separate from the first portion of the CPU, the first portion of the memory, and the first portion of the disk I/O bandwidth; and generating a control group for the user application, the control group being a kernel-level mechanism usable to associate the user application with the second portion of the system resource; and migrating the user application to the control group, wherein migrating the user application to the control group allocates the second portion of the system resource to the user application and limits access by the user application to second portion of the system resource to prevent reoccurrence of the interference event.

14. The non-transitory computer-readable medium of claim 13, wherein the interference event comprises a memory allocation collision event.

15. The non-transitory computer-readable medium of claim 13, wherein the interference event is related to central processing unit (CPU) usage.

16. The non-transitory computer-readable medium of claim 13, wherein the interference event is related to disk input/output (I/O) bandwidth usage.

17. The non-transitory computer-readable medium of claim 13, wherein the operations further comprise, subsequent to detecting the interference event, identifying the user application by accessing a running application list comprising an indication that that user application was executing at a time corresponding to the interference event.

* * * * *